United States Patent
McNabb et al.

(10) Patent No.: US 10,536,815 B2
(45) Date of Patent: Jan. 14, 2020

(54) TRACKING A WIRELESS DEVICE USING A SEAMLESS HANDOFF BETWEEN A VEHICLE AND A MOBILE DEVICE

(71) Applicant: Ford Global Technologies, LLC, Dearborn, MI (US)

(72) Inventors: David McNabb, Ann Arbor, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/618,096

(22) Filed: Jun. 8, 2017

(65) Prior Publication Data
US 2018/0359611 A1    Dec. 13, 2018

(51) Int. Cl.
| | | |
|---|---|---|
| *H04W 24/00* | (2009.01) | |
| *G01S 3/02* | (2006.01) | |
| *G01S 1/08* | (2006.01) | |
| *G08B 23/00* | (2006.01) | |
| *H04M 1/00* | (2006.01) | |
| *H04W 4/04* | (2009.01) | |
| *H04W 36/18* | (2009.01) | |
| *H04W 36/30* | (2009.01) | |
| *H04W 84/18* | (2009.01) | |

(52) U.S. Cl.
CPC ........... *H04W 4/046* (2013.01); *H04W 36/18* (2013.01); *H04W 36/30* (2013.01); *H04W 84/18* (2013.01)

(58) Field of Classification Search
CPC ..... H04W 4/046; H04W 36/18; H04W 36/30; H04W 84/18
USPC .................................................. 455/456.3
See application file for complete search history.

(56) References Cited

U.S. PATENT DOCUMENTS

| | | | | |
|---|---|---|---|---|
| 5,021,794 A | * | 6/1991 | Lawrence | ................. G01S 5/04 340/539.1 |
| 6,801,850 B1 | * | 10/2004 | Wolfson | ............. G01C 21/3415 340/995.23 |
| 7,116,272 B2 | | 10/2006 | Wolf et al. | |

(Continued)

FOREIGN PATENT DOCUMENTS

| | | |
|---|---|---|
| CN | 204681599 U | 9/2015 |
| WO | WO 2015061633 A2 | 4/2015 |

OTHER PUBLICATIONS

Find Lost Items in Seconds, https://www.thetrackr.com/.

(Continued)

*Primary Examiner* — Anthony S Addy
*Assistant Examiner* — Mark G. Pannell
(74) *Attorney, Agent, or Firm* — Frank Lollo; Eversheds Sutherland (US) LLP (57) ABSTRACT

Method and apparatus are disclosed for tracking a wireless device using a seamless handoff between a vehicle and a mobile device. An example vehicle includes internal and external antennas, a sensor, and an infotainment head unit with a display. The infotainment head unit tracks, using the external antenna, a wireless-enabled object exterior to the vehicle. The infotainment head unit also determines a location of the mobile device associated with the vehicle based on the sensor and the internal and external antennas. Additionally, when the mobile device exits the vehicle, the infotainment head unit automatically transitions tracking information to the mobile device.

17 Claims, 6 Drawing Sheets

(56) References Cited

U.S. PATENT DOCUMENTS

| | | | |
|---|---|---|---|
| 8,009,009 B2 | 8/2011 | Kalliola et al. | |
| 8,965,284 B2 | 2/2015 | Honkanen et al. | |
| 8,965,398 B2 | 2/2015 | Zhu et al. | |
| 9,473,891 B2 | 10/2016 | Colby et al. | |
| 9,525,968 B2 | 12/2016 | Pounds et al. | |
| 2001/0027371 A1* | 10/2001 | Winner | B60K 31/0008 701/96 |
| 2002/0173908 A1* | 11/2002 | Sakamoto | G01C 21/3688 701/431 |
| 2004/0075532 A1* | 4/2004 | Ueda | E05B 77/48 340/5.72 |
| 2004/0142732 A1* | 7/2004 | Ueda | B60R 25/245 455/569.2 |
| 2005/0258936 A1* | 11/2005 | Ghabra | B60R 25/245 340/5.72 |
| 2008/0036610 A1* | 2/2008 | Hokuf | A01K 11/008 340/573.3 |
| 2009/0157583 A1* | 6/2009 | Couckuyt | G06Q 30/02 706/46 |
| 2010/0141412 A1* | 6/2010 | Partin | G08G 1/205 340/426.18 |
| 2014/0309864 A1* | 10/2014 | Ricci | H04W 48/04 701/36 |
| 2014/0317698 A1* | 10/2014 | Zafiroglu | H04L 63/0823 726/4 |
| 2016/0018505 A1* | 1/2016 | Yu | H04B 7/18513 342/386 |
| 2016/0358479 A1* | 12/2016 | Riedelsheimer | H04L 67/12 |
| 2016/0381510 A1 | 12/2016 | Reynolds | |
| 2017/0248436 A1* | 8/2017 | Goldman-Shenhar | G01C 21/367 |

OTHER PUBLICATIONS

Geolocation With Bluetooth Beacons, Sydney Ram, Jul. 21, 2014, https://www.mutuallyhuman.com/blog/2014/07/21/geolocation-with-bluetooth-beacons.

Search Report dated Nov. 12, 2018 for GB Patent Application No. GB 1809297.3 (3 pages).

\* cited by examiner

FIG. 6

TRACKING A WIRELESS DEVICE USING A SEAMLESS HANDOFF BETWEEN A VEHICLE AND A MOBILE DEVICE

TECHNICAL FIELD

The present disclosure generally relates to vehicle-based wireless device tracking and, more specifically, tracking a wireless device using a seamless handoff between a vehicle and a mobile device.

BACKGROUND

Increasingly, wireless technology, such as Bluetooth® Low Energy (BLE), is being incorporated into various objects. These wireless devices with BLE can be located and tracked by communicating with vehicles or smartphones equipped with similar BLE wireless technology.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for tracking a wireless device, using a seamless handoff to track the device using a vehicle or a mobile device interchangeably. An example vehicle includes internal and external antennas, a sensor, and an infotainment head unit with a display. The infotainment head unit tracks (localizes), using the external antenna, a wireless-enabled object exterior to the vehicle. The infotainment head unit also determines a location of the mobile device associated with the vehicle based on the sensor and the internal and external antennas. Additionally, when the mobile device exits the vehicle, the infotainment head unit automatically transitions tracking information to the mobile device.

An example method to track a wireless-enabled object with a vehicle and a mobile device includes tracking, using an external antenna of the vehicle, the wireless-enabled object exterior to the vehicle. The example method also includes determining a location of the mobile device associated with the vehicle based on, at least, one sensor and the internal antenna and the external antennas. Additionally, the example method includes, when the mobile device exits the vehicle; automatically transitioning tracking information to the mobile device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles (such as cars, trucks, sports utility vehicles, motorcycles, boats, etc.) are increasingly manufactured with wireless devices, such as Bluetooth® and/or wireless local area network devices. As the range of these wireless devices increases, the ability to track objects (e.g., phones, Bluetooth® tags, wireless beacons, vehicles, etc.) further away increases. For example, Bluetooth® 5.0 has a reported range of over 400 meters (m) (1312 feet) by the Bluetooth® SIG (Special Interest Group) and up to 1 kilometer (km) (3280 feet) in direct aerial line of sight test by independent organizations. As disclosed below, the vehicle is paired with a mobile device (e.g., a phone, a key fob, a Bluetooth® tag, etc.). However, the ability to track the object is not limited to the Bluetooth® protocol. The system described below may be used with any wireless protocol (e.g., cellular protocols, wireless local area network protocols, dedicated short range communication protocols, etc.) in which a signal strength value is measured as part of communication between the object and the vehicle/phone. After the vehicle and the mobile device are paired, the vehicle can track the mobile device. As used herein, pairing refers to a process wherein the vehicle receives and stores a unique identifier for the object so that the object is identifiable via messages broadcast by the object that include the unique identifier. For example, the vehicle may track a Bluetooth® tag attached to a backpack of a child. The vehicle receives wireless broadcasts from the mobile device being tracked. In some examples, the vehicle determines the location of the tracked mobile device based on the received signal strength indicator (RSSI) included with the broadcast. In some such examples, as the vehicle moves and receives more RSSI measurements, the vehicle triangulates the position of the tracked mobile device. Alternatively or additionally, in some examples, the object being tracked includes GPS coordinates in the communication between the vehicle and the object. The vehicle correlates the position with a map of a navigation system and displays the map with the position marked on a display, such as a center console display. In some examples, the interface also provides directions between the current location of the vehicle and the position of the tracked mobile device.

The object being tracked may not be in a location adjacent to a road. For example, the object may be in the middle of a park. The vehicle detects when the driver (e.g., a mobile device associated with the driver) exits the vehicle. For example, when the vehicle reached a parking lot of the park, the driver may exit the vehicle. When the driver exits the vehicle, the vehicle seamlessly transitions the tracking information to a mobile device (such as a smart phone, a smart watch, a tablet, etc.). As used herein, the phrase "seamlessly transition" refers to transferring the tracking information to an application (e.g., Fordpass, etc.) executing on the mobile device without further interaction from the user and providing an interface on the mobile device to facilitate tracking the object. Additionally, when the vehicle detects the driver enter the vehicle, the vehicle requests the tracking information from the mobile device and begins to track the object.

Figure 1:
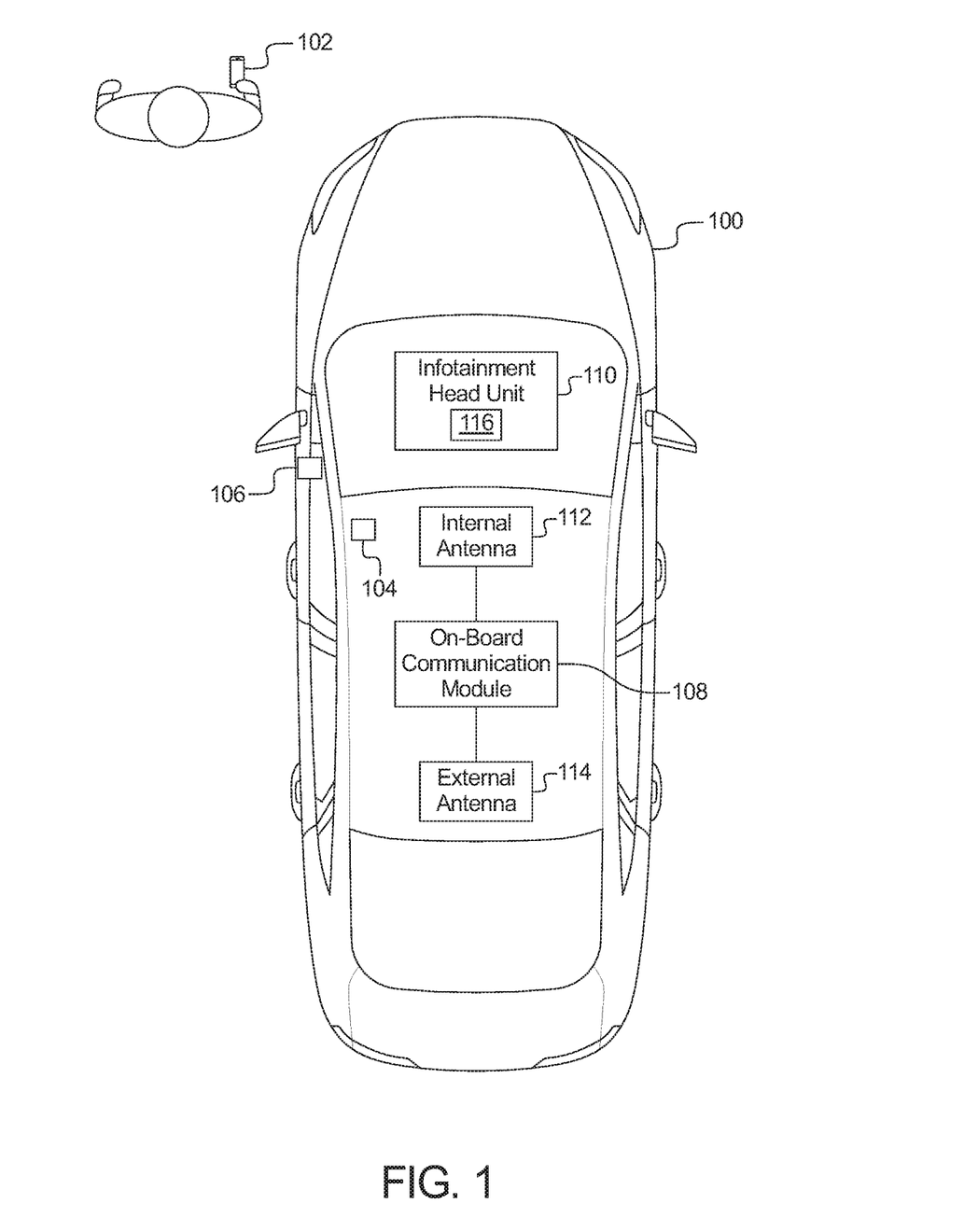
FIG. 1 illustrates a vehicle and a mobile device operating in accordance with the teaching of this disclosure.

FIG. 1 illustrates a vehicle 100 and a mobile device 102 operating in accordance with the teaching of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). For example, when an object is being tracked, the vehicle 100 may autonomously follow a path calculated to reach the tracked object. In the illustrated example the vehicle 100 includes sensors 104 and 106, an on-board communication module 108, and an infotainment head unit 110.

The sensors may be arranged in and around the vehicle 100 in any suitable fashion. The sensors may be mounted to measure properties around the exterior of the vehicle 100. Additionally, some sensors may be mounted inside the cabin of the vehicle 100 or in the body of the vehicle 100 (such as, the engine compartment, the wheel wells, etc.) to measure properties in the interior of the vehicle 100. For example, such sensors may include accelerometers, odometers, tachometers, pitch and yaw sensors, wheel speed sensors, microphones, tire pressure sensors, and biometric sensors, etc. In the illustrated example, the sensors include a weight sensor 104 and/or a door position sensor 106. The weight sensor 104 detects when an occupant (such as the driver) is sitting in the seat. The weight sensor 104 is used to determine when the driver is sitting in the driver's seat. For example, when after a period of time (e.g., ten seconds, twenty second, etc.) from the weight sensor 104 transitioning from detecting the occupant to not detecting the occupants, the reading from the weight sensor 104 may be used to determine that particular occupant has left the vehicle 100. The door position sensor 106 detects when a corresponding door of the vehicle 100 is opened or closed. The door position sensor 106 is used to detect when the occupant leaves the vehicle 100.

The on-board communication module 108 includes wireless network interfaces to enable communication with external networks and external wireless-network enabled objects (e.g., the object 204 of FIG. 2 below). The on-board communication module 108 also includes hardware (e.g., processors, memory, storage, antenna, etc.) and software to control the wireless network interfaces. In the illustrated example, the on-board communication module 108 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, on-board communication module 108 includes a global positioning system (GPS) receiver. Alternately, in some examples, the GPS receiver is a separate module. The external network(s) may be a public network, such as the Internet; a private network, such as an intranet; or combinations thereof, and may utilize a variety of networking protocols now available or later developed including, but not limited to, TCP/IP-based networking protocols. In such a manner, the vehicle 100 may communicate with various servers hosted on the external networks, such as the servers of navigation system providers (e.g., Google Maps, Waze, Apple Maps, etc.).

Specifically, the on-board communication module 108 is communicatively coupled to an internal antenna 112 and an external antenna 114. The internal antenna 112 may utilize an antenna array and the external antenna may be a solitary antenna within one module or a cluster of antennas/transceivers in separate modules located at various locations around the vehicle. The internal antenna 112 in a cabin of the vehicle 100 to communicate with the mobile device 102 inside the vehicle 100 via a wireless protocol (e.g., Bluetooth®, Wi-Fi®, etc.). The external antenna 114 is on the exterior of the vehicle 100 (e.g., integrated into a fin antenna on top of the vehicle 100) to communicate with the mobile device 102 while outside the vehicle 100 and/or communicate with the object to be tracked. In some examples, the internal antenna 112 and the external antenna 114 are used to detect whether the mobile device 102 is inside the vehicle 100 or outside the vehicle 100. For example, the RSSI values between the mobile device 102 and the antennas 112 and 114 may be compared to determine whether the mobile device 102 is inside the vehicle 100 (the RSSI value between the mobile device 102 and the internal antenna 112 is stronger than the RSSI value between the mobile device 102 and the external antenna 114) or outside the vehicle 100 (the RSSI value between the mobile device 102 and the external antenna 114 is stronger than the RSSI value between the mobile device 102 and the internal antenna 112).

The infotainment head unit 110 provides an interface between the vehicle 100 and a user. The infotainment head unit 110 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 110 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 110 displays the infotainment system on, for example, the center console display.

The infotainment head unit 110 also includes an object tracker 116. The object tracker 116 tracks an object specified by an occupant of the vehicle 100. In some examples, the object tracker 116 displays a list of objects with wireless modules that have been paired with the vehicle 100 so that the occupant can choose the object to track. When the object is selected, the object tracker 116 determines whether the object is within range of the vehicle 100. The object is within range of the vehicle 100 when the on-board communication module 108 receives a broadcast which includes the identifier of the object being tracked. In some examples, when the object includes a GPS receiver, the object includes its location in the broadcasts and/or responds with a message which includes its location in response to a request sent by the object tracker 116. Alternately, in some examples, the object tracker 116 determines the location of the object based on a measured RSSI value of the broadcasts by the object.

The RSSI values measure an open-path signal strength of the radio frequency signal as received by the object to be track of a message sent by the on-board communication module 108. The object includes the RSSI value in subsequent messages. The RSSI is measured in signal strength percentage, the values (e.g., 0-100, 0-137, etc.) of which are defined by a manufacturer of hardware used to implement the wireless module of the object. Generally, a higher RSSI means that the object is closer to the corresponding vehicle 100. The RSSI values are used to determine the radial distance from the vehicle 100 to the object. In some examples, the vehicle 100 uses known techniques to determine the distance to the object using the RSSI value.

When the location of the object is determined, the object tracker 116 (a) displays the location of the object on an interface (e.g., the center console display) and (b) calculates directions from the current location of the vehicle 100 to the object. In some examples, to calculate the directions, the object tracker 116, via the on-board communication module 108, interfaces with a navigation system. For example, the object tracker 116 may, via an application programming interface (API), provide the location of the object of the navigation system to facilitate the navigation system providing directions to that location.

The object tracker 116 monitors the location of the mobile device 102 communicatively coupled to the vehicle 100 to determine when the mobile device 102 leaves the vehicle 100. For example, the driver may exit the vehicle 100 with the mobile device 102 when the object is relatively nearby and/or when the estimated location of the object is in an area which in not accessible to the vehicle 100. In some examples, the vehicle 100 is communicatively coupled to the mobile device via a wireless interface of the on-board communication module 108. In some examples, an application executing on mobile device 102 is compatible with an API (such as Ford Applink, etc.) to facilitate communication between the vehicle 100 and the mobile device 102. In the illustrated example, the object tracker 116 uses the weight sensor 104, the door position sensor 106, the internal antenna(s) 112 and/or the external antenna(s) 114 to determine whether the mobile device in inside or outside the vehicle 100. Additionally or alternatively, the object tracker 116 may use other sensors to detect the presence of the driver, such as cameras, steering wheel grip sensors, and/or infrared sensors, etc. For example, the object tracker 116 may use a combination of the weight sensor 104 and the antennas 112 and 114 to determine the location of the mobile device 102. In some examples, the object tracker 116 additionally uses the state of the ignition (e.g., in an "on" position or in an "off" position) and/or the position of the gear selector to determine whether the mobile device 102 has left the vehicle 100. For example, the object tracker 116 may determine that the mobile device 102 have left the vehicle 100 when the gear selector is in park, the weight sensor 104 indicates that the occupant is no longer in the driver's seat, and the door position sensor 106 indicates that the driver's side door has opened.

When the object tracker 116 detects the mobile device 102 transitioning from being inside the vehicle 100 to being outside the vehicle 100, the object tracker 116 seamlessly transitions the tracking information from the vehicle 100 to the mobile device 102. In some examples, to seamlessly transition, the object tracker 116 (a) provides a trigger to cause an application (e.g. FordPass, Google Maps, etc.) executing on the mobile device 102 to enter a tracking mode, and (b) provides the estimated location of the object. In some examples, when the mobile device 102 has not paired with the object, the object tracker 116 provides the credentials (e.g., the identifier, etc.) in order to communication with and/or track the object. In some examples, when the object tracker 116 detects the mobile device reentering the vehicle 100, the object tracker 116 prompts the occupant (e.g. via the center console display) whether the occupants wants to continue tracking the object. If the occupant does want to continue tracking the object, the object tracker requests the estimated location of the object from the mobile device 102.

In some examples, in response to an input by an occupant of the vehicle 100, the object tracker 116 sends the tracking information the mobile device 102 while continuing to track the object by the vehicle 100. For example, if the object is a dog collar affixed to a dog, the driver may continue to track the dog collar in the vehicle 100 while a passenger tracks the dog collar on foot with the mobile device 102. In some examples, the object tracker 116 (a) provides a trigger to cause an application (e.g. FordPass, Google Maps, etc.) executing on the mobile device 102 to enter a tracking mode, and (b) provides the estimated location of the object.

In some examples, the object tracker 116 determines that the object is moving. When the object tracker 116 determines that the object is moving, the object tracker 116 may take remedial measures and/or present options (e.g., via the center console display) to occupant, which may include (a) recalculating directions based on the current location of the object, (b) calculating directions to attempt to intercept the device based on the projected path of the device, (c) waiting until device has come to rest for 5 minutes or more, (d) determining whether the movement of the object matches routes of known buses or trains, and/or (e) continuing to track the location of the object but cease providing directions.

Figure 2:
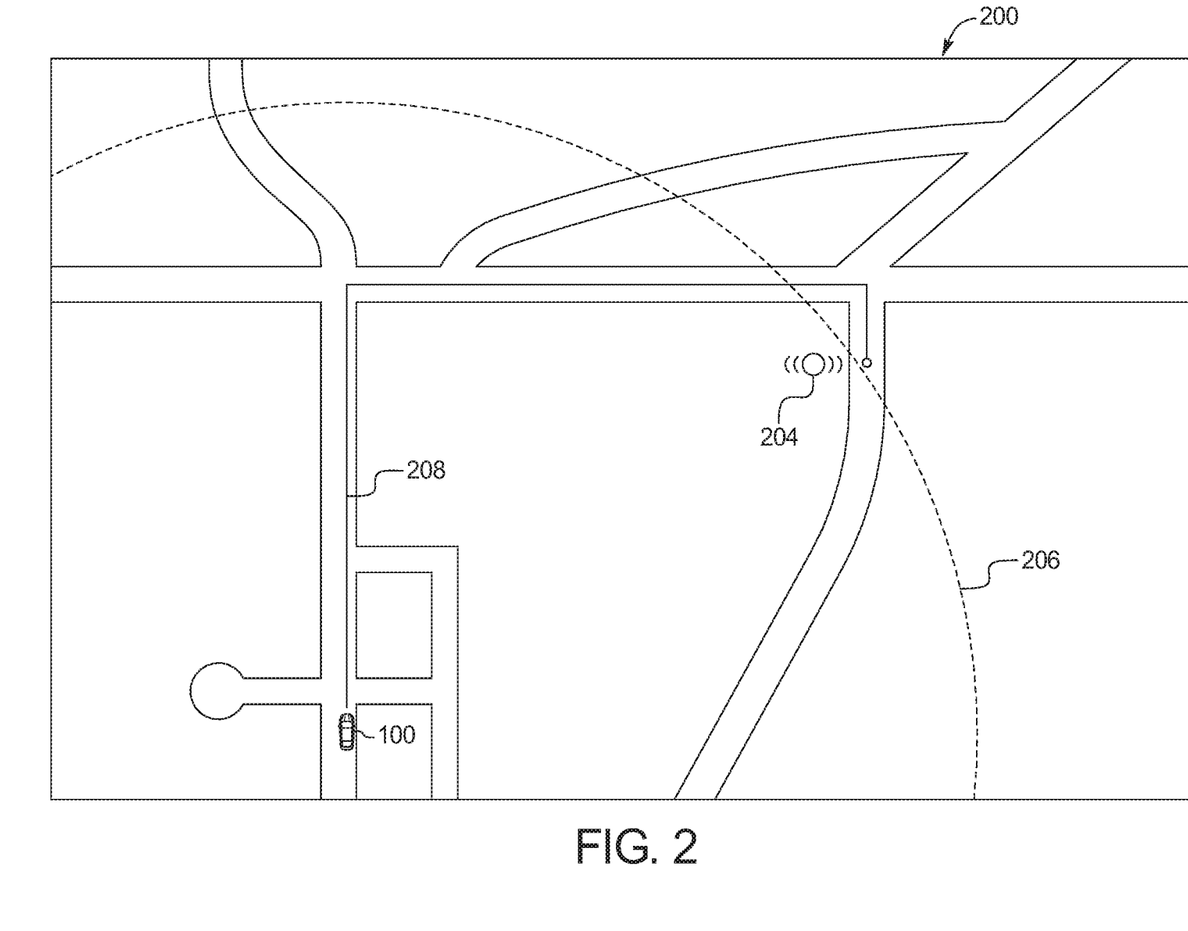
FIG. 2 depicts an example interface a display of the vehicle of FIG. 1.

FIG. 2 depicts a map 200 (e.g., displayed on the center console display of the infotainment head unit 110) of an area around the vehicle 100 of FIG. 1. When the object 204 to be tracked is located (e.g., via the RSSI values, via reported coordinates, etc.), an interface (e.g., the interface 300 of FIG. 3 below) displays the map 200 marking the location of the object 204. In the illustrated example, the map 200 displays an indicator zone 206 that indicates the range at which tracker 116 is able to determine the location of the object 204. Additionally, in the illustrated example, the map 200 displays a route line 208 from the current location of the vehicle 100 to a location at or near the object 204 that is accessible by the vehicle 100.

Figure 3:
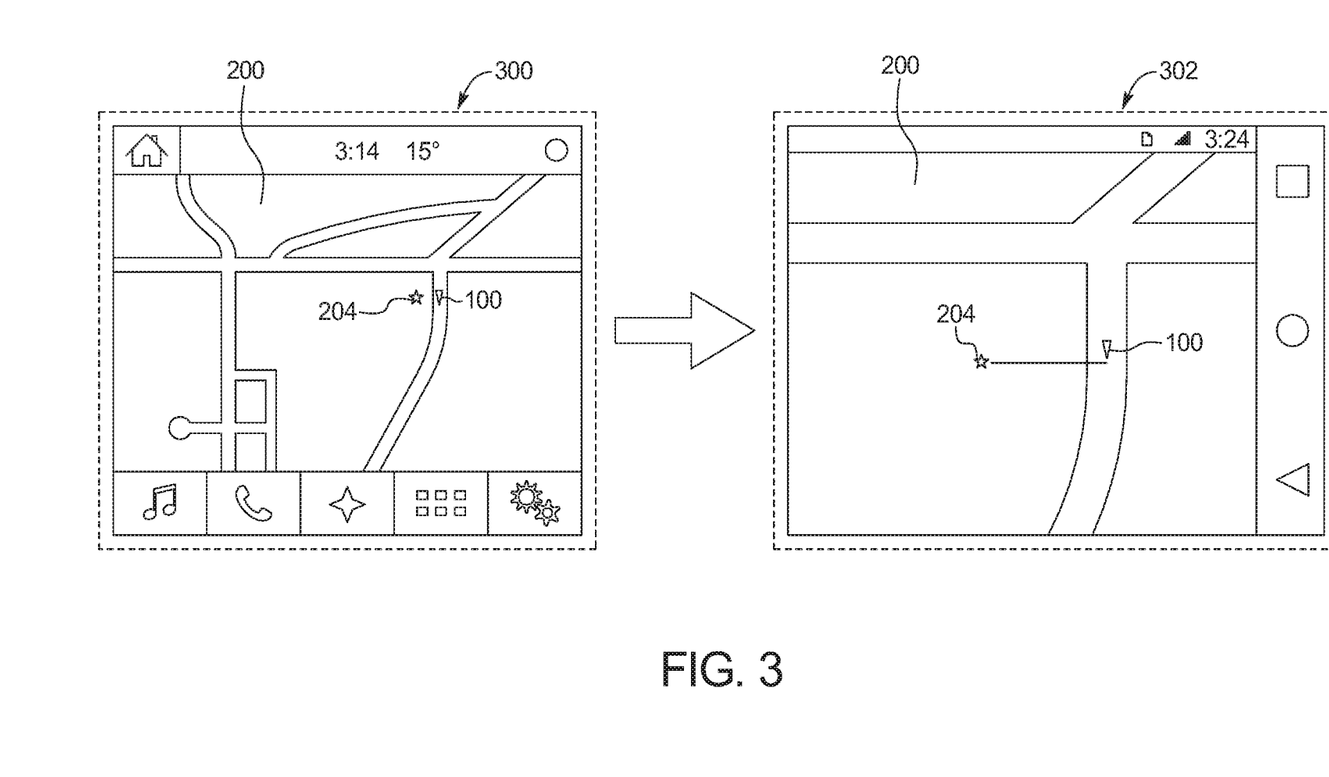
FIG. 3 depicts a transition between the display of the vehicle of FIG. 1 and a display on the mobile device of FIG. 1.

FIG. 3 depicts a transition between an interface 300 of the vehicle 100 of FIG. 1 and an interface 302 on the mobile device 102 of FIG. 1 when the mobile device 102 leaves the vehicle 100. The object tracker 116 sends the approximate location of the object 204 to the application executing on the mobile device 102. In the illustrated example, the application executing on the mobile device 102 recalculates directions to the object 204 to take into account mobility afforded to the occupant when not in the vehicle 100 (e.g., using walkways, bike paths, etc.).

Figure 4:
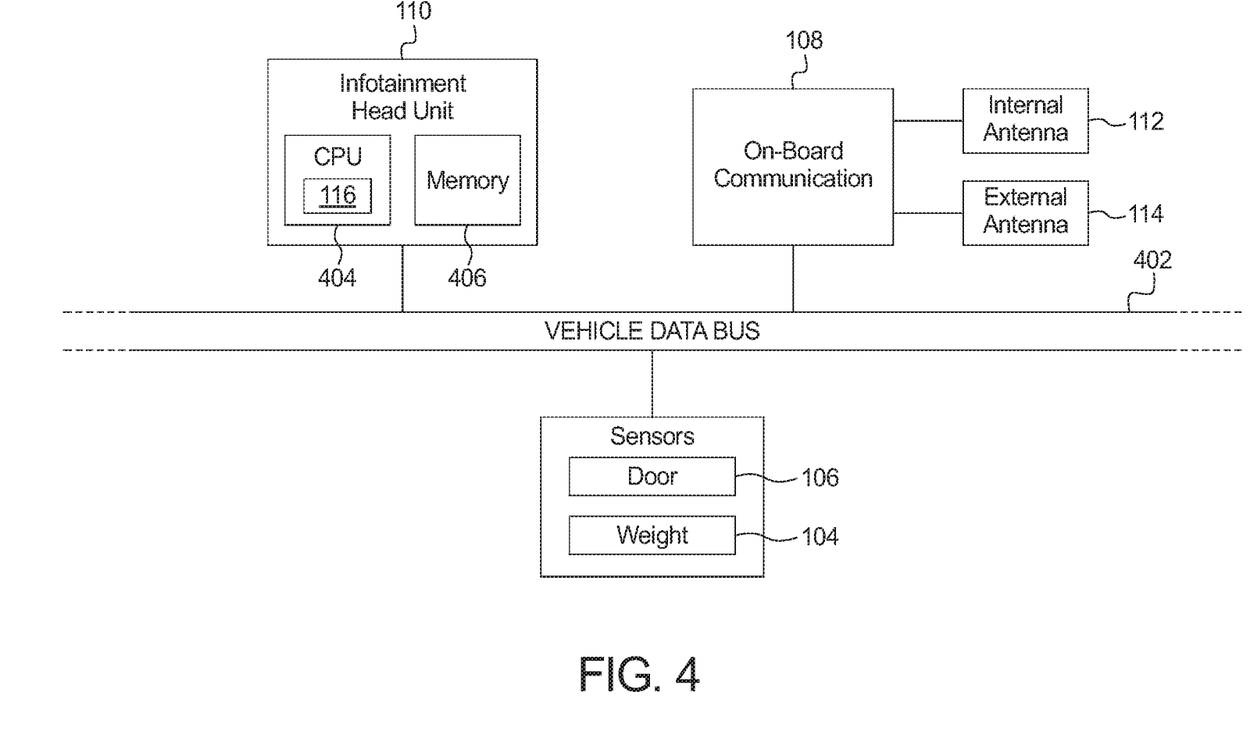
FIG. 4 is a block diagram of electronic components of the vehicle of FIG. 1.

FIG. 4 is a block diagram of electronic components 400 of the vehicle 100 of FIG. 1. In the illustrated example, the electronic components 400 include the sensors 104 and 106, the on-board communication module 108, the infotainment head unit 110, the antennas 112 and 114, and a vehicle data bus 402.

The infotainment head unit 110 includes a processor or controller 404 and memory 406. In the illustrated example, the infotainment head unit 110 is structured to include object tracker 116. The processor or controller 404 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 406 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, solid-state memory, etc.), unalterable memory (e.g., EPROMs), read-only memory, and/or high-capacity storage devices (e.g., hard drives, solid state drives, etc). In some examples, the memory 406 includes multiple kinds of memory, particularly volatile memory and non-volatile memory.

The memory 406 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 406, the computer readable medium, and/or within the processor 404 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 402 communicatively couples the sensors 104 and 106, the on-board communication module 108, and the infotainment head unit 110. In some examples, the vehicle data bus 402 includes one or more data buses. The vehicle data bus 402 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
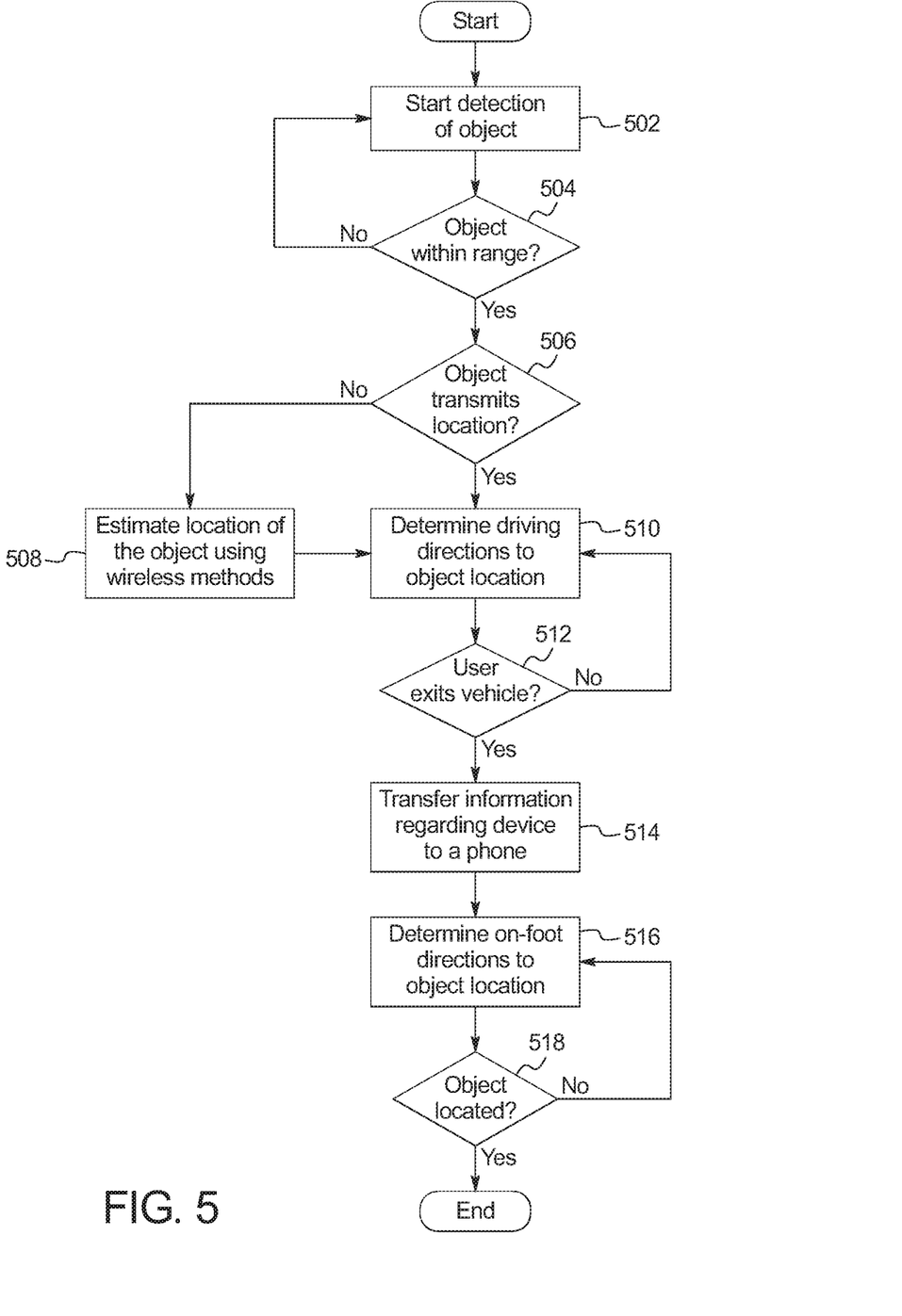
FIG. 5 is a flowchart of a method to track an object and to seamlessly transition between the vehicle and the mobile device.

FIG. 5 is a flowchart of a method to track an object 204 and to seamlessly transition between the vehicle 100 and the mobile device 102. Initially, the object tracker 116 starts detection of the object 204 to be tracked (block 502). In some examples, the occupant selects the object 204 off a list of objects presented on a display of the vehicle 100 to indicate that the object tracker 116 is to start detection. The object tracker 116, based on an identifier of the object 204, determines whether the object is in range (block 504). The object tracker 116 determines that the object is in range when the object tracker 116 receives, via the on-board communication module 108, a broadcasts associated with the identifier of the object 204 to be tracked. When the object 204 is in range, the object tracker 116 determines whether the messages from the object 204 include a location (e.g., coordinates) of the object 204 (block 506). When the messages from the object 204 do not includes the location, the object tracker estimates the location of the object 204 based on RSSI values in the messages (block 508). In some examples, the object tracker 116 uses trilateration based on the change of the RSSI values as the vehicle 100 moves to estimate the location of the object 204.

After receiving a message with the location of the object 204 or estimating the location of the object 204, the object tracker determines driving directions to the location of object 204 from the current location of the vehicle 100 (block 510). The object tracker 116 continues to provide directions (e.g., via the map 200 displayed on the interface 300 of the center console display of the infotainment head unit 110) until the object tracker 116 detects the mobile device 102 leave the vehicle 100 (block 512). In some examples, the determines when the mobile device 102 leaves the vehicle 100 based on the weight sensor 104, the door position sensor 106 and/or the RSSI values determined at the internal antenna 112 and the external antenna 114.

When the object tracker 116 detects that the mobile device 102 have left the vehicle 100, the object tracker 116 sends, to the mobile device 102, a trigger to cause the corresponding application executing on the mobile device 102 to enter a tracking mode and the tracking data (e.g., the location of the object being tracked 204, route information, etc.) (block 514). The mobile device 102 determines on-foot directions to the object 204 based on the tracking data received from the vehicle 100 (block 516). The mobile device 102 continues to determine directions until the object is located (e.g., the position of the mobile device is proximate the position of the object 204, etc.) (block 518).

Figure 6:
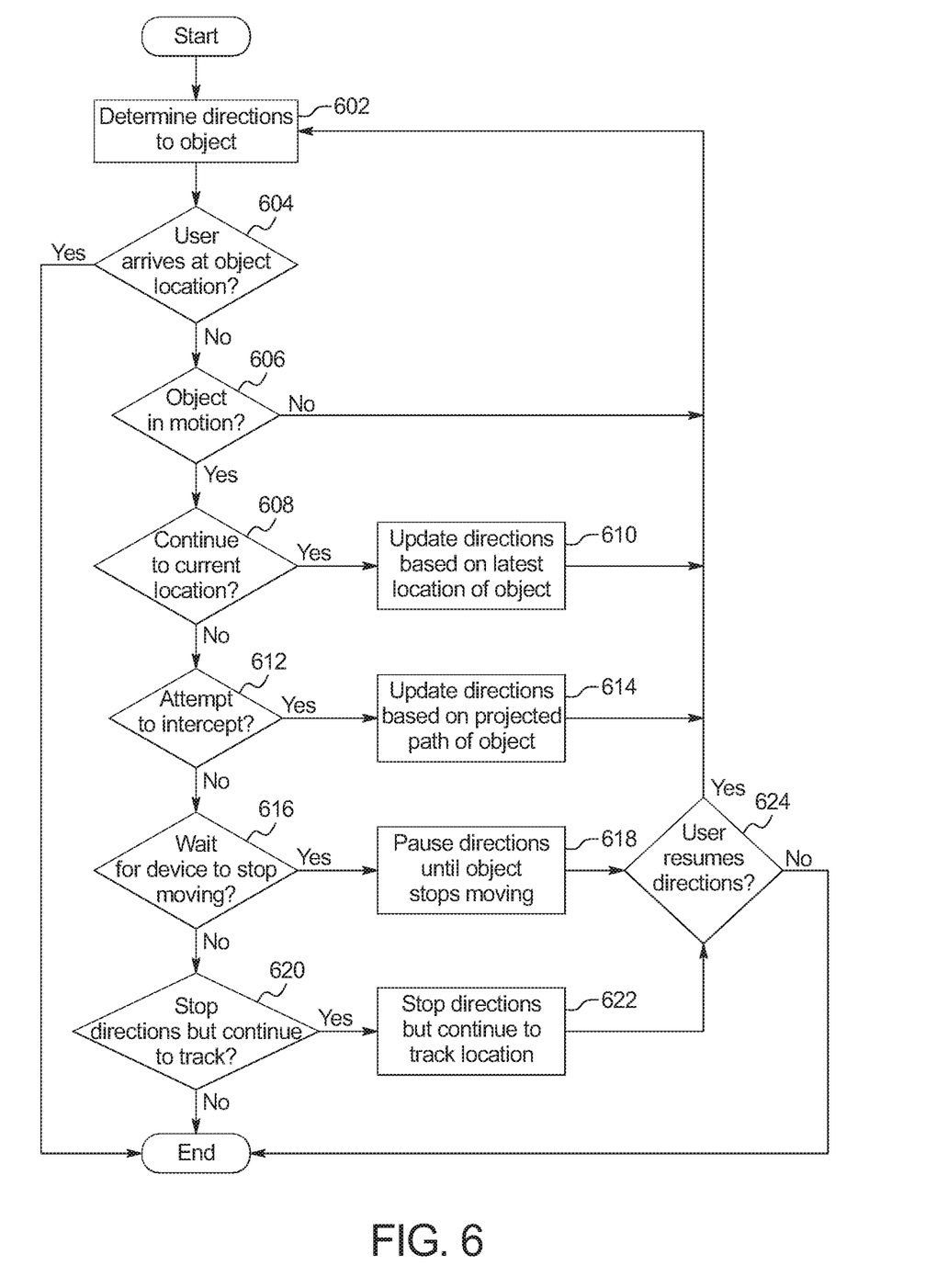
FIG. 6 is a flowchart of a method to track an object with the vehicle.

FIG. 6 is a flowchart of a method to track an object 204 with the vehicle 100. Initially, the object tracker 116 determines directions to the object 204 being tracked (block 602). The object tracker 116 determines whether user arrives at the location of the object 204 (block 604). When the user has not arrived at the location of the object 204, the object tracker 116 determines whether the object 204 is moving (606). For example, the change in the RSSI values received from the object 204 may correlate with the object 204 being in motion. When the object 204 is in motion, the object tracker 116 determines whether to update the directions (block 608). For example, the object tracker may prompt the user on the display or check to see if the user has set a preference. When the directions are to be updated, the object tracker 116 updates the directions based on the current location of the object 204 (block 610). The object tracker 116 determines whether to attempt to intercept the object 204 (block 612). When the object 204 is to be intercepted, the object tracker 116 updates the directions based on a projected path of the object 204 (block 614). In some examples the projected path is determined based on the trajectory of the object 204, the traffic around the object 204, the past location information about the object 204, and/or relative importance to the streets in the area (e.g., arterial roads versus collector roads and local roads, etc.).

The object tracker 116 determines whether to wait until the object 204 stops moving (block 616). For example, the object tracker may prompt the user on the display or check to see if the user has set a preference. When tracking is to wait, the object tracker pauses the directions until the object stops moving (block 618). The object tracker 116 prompts the user whether to stop providing directions (block 620). If the user indicates to stop providing directions, the object tracker 116 stops providing directions, but continues to track the object 204 (block 622). When the object tracker 116 waits until the object 204 stops moving or stops providing directions, but continues to track the object 204, the object tracker waits until the user indicates to continue providing directions (block 624).

The flowcharts of FIGS. 5 and 6 are representative of machine readable instructions stored in memory (such as the memory 406 of FIG. 4) that comprise one or more programs that, when executed by a processor (such as the processor 404 of FIG. 4), cause the vehicle 100 to implement the example object tracker 116 of FIGS. 1 and 4. Further, although the example program(s) is/are described with reference to the flowcharts illustrated in FIGS. 5 and 6, many other methods of implementing the example object tracker 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
an infotainment head unit with a display and antennas configured to:
display a real-time map including directions to a wireless-enabled object exterior to the vehicle;
determine a location of a mobile device associated with the vehicle, wherein the antennas comprise internal and external antennas, wherein to determine the location of the mobile device, the infotainment head unit is configured to compare a first signal strength between the mobile device and the internal antenna and a second signal strength between the mobile device and the external antenna; and
responsive to the mobile device exiting the vehicle:
transition tracking information to the mobile device; and
determine, based on the second signal strength becoming greater than the first signal strength, on-foot directions from the vehicle to the wireless-enabled object.

2. The vehicle of claim 1, further including a sensor, wherein the infotainment head unit is configured to determine a location of the mobile device based on the sensor and the antennas.

3. The vehicle of claim 2, wherein the sensor is a seat weight sensor, and wherein the infotainment head unit is configured to automatically determine the on-foot directions in response to the seat weight sensor indicating that a driver seat is not occupied.

4. The vehicle of claim 2, wherein the sensor is a door position sensor, and wherein the infotainment head unit is configured to automatically determine the on-foot directions in response to the door position sensor indicating that a driver door is open.

5. The vehicle of claim 1, wherein the infotainment head unit is configured to determine a location of the wireless-enabled object.

6. The vehicle of claim 5, wherein to determine the location of the wireless-enabled object, the infotainment head unit is configured to retrieve location information from a message broadcast by the wireless-enabled object.

7. The vehicle of claim 5, wherein to determine the location of the wireless-enabled object, the infotainment head unit is configured to estimate the location of the wireless-enabled object based on signal strength values of a message exchanged with the wireless-enabled object.

8. The vehicle of claim 1, wherein transitioning the tracking information to the mobile device causes the mobile device to display an interface to track the wireless-enabled object.

9. The vehicle of claim 1, wherein the infotainment head unit with the display and the antennas estimates the projected path of the wireless-enabled object based at least in part on a trajectory of the moving wireless-enabled object, past location information of the moving wireless-enabled object, and relative importance to streets in an area at which the wireless-enabled object is located.

10. A method to track a wireless-enabled object with a vehicle and a mobile device comprising:
determining directions to the wireless-enabled object exterior to the vehicle using at least one external antenna of the vehicle;
displaying, via a display of the vehicle, the directions;
determining, with a processor of the vehicle, a location of the mobile device associated with the vehicle based on at least one internal antenna of the vehicle and the at least one external antenna by comparing a first signal strength between the mobile device and the at least one internal antenna and a second signal strength between the mobile device and the at least one external antenna; and
responsive to the mobile device exiting the vehicle:
automatically transitioning tracking information to the mobile device; and
automatically determining, based on the second signal strength becoming greater than the first signal strength, on-foot directions from a location at which the mobile device has exited the vehicle to the wireless-enabled object.

11. The method of claim 10, wherein determining the location of the mobile device includes determining the location of the mobile device based on a sensor, the at least one internal antenna, and the at least one external antenna.

12. The method of claim 11, wherein the sensor is a seat weight sensor.

13. The method of claim 11, wherein the sensor is a door position sensor.

14. The method of claim 10 further including determining the location of the wireless-enabled object.

15. The method of claim 14, wherein determining the location of the wireless-enabled object includes retrieving location information from a message broadcast by the wireless-enabled object.

16. The method of claim 14, wherein determining the location of the wireless-enabled object includes estimating the location of the wireless-enabled object based on signal strength values of the received message exchanged from the wireless-enabled object.

17. The method of claim 10, wherein when the mobile device exits the vehicle and an indication to continue tracking is received, continuing to track the wireless-enabled object via the vehicle after automatically transitioning the tracking information to the mobile device.

* * * * *